(12) United States Patent
Casey (10) Patent No.: US 9,055,330 B2
(45) Date of Patent: Jun. 9, 2015

(54) MECHANISM TO DIVERT AN IP FLOW OVER A NON-IP TRANSPORT

(75) Inventor: Liam Casey, Ottawa (CA)

(73) Assignee: RPX Clearinghouse LLC, San Francisco, CA (US)

( * ) Notice: Subject to any disclaimer, the term of this patent is extended or adjusted under 35 U.S.C. 154(b) by 418 days.

(21) Appl. No.: 12/992,122

(22) PCT Filed: May 12, 2009

(86) PCT No.: PCT/CA2009/000659
§ 371 (c)(1),
(2), (4) Date: Feb. 9, 2011

(87) PCT Pub. No.: WO2009/137928
PCT Pub. Date: Nov. 19, 2009

(65) Prior Publication Data
US 2012/0011224 A1 Jan. 12, 2012

(30) Foreign Application Priority Data

May 12, 2008 (GB) .................................. 0808447.7

(51) Int. Cl.
*G06F 15/16* (2006.01)
*H04N 21/4363* (2011.01)
(Continued)

(52) U.S. Cl.
CPC ..... *H04N 21/4363* (2013.01); *H04N 21/64322* (2013.01); *H04N 21/64707* (2013.01); *H04N 21/6587* (2013.01); *H04L 65/4076* (2013.01); *H04L 65/103* (2013.01)

(58) Field of Classification Search
USPC ........................................................ 709/219
See application file for complete search history.

(56) References Cited

U.S. PATENT DOCUMENTS

| 6,937,596 B2* | 8/2005 | Sjolund et al. ................. 370/352 |
| 2004/0071148 A1* | 4/2004 | Ozaki et al. .................... 370/401 |

(Continued)

FOREIGN PATENT DOCUMENTS

| CN | 1561609 A1 | 1/2005 |
| JP | 11-27322 A | 1/1999 |

(Continued)

OTHER PUBLICATIONS

English_Translation_of_Japanese_Office_Action and Japanese Search Report for Japanese Serial No. 2011-508780, dated Nov. 11, 2010 and Japanese Language Japanese Office Action consisting of 9-pages.

(Continued)

*Primary Examiner* — Lisa Lewis
*Assistant Examiner* — Henry Tsang
(74) *Attorney, Agent, or Firm* — Christopher & Weisberg, P.A.

(57) ABSTRACT

Data between a client and a server is pinned through a receiving interworking unit and a transmitting interworking unit connected via a non-IP based communications path. The receiving interworking unit and transmitting interworking unit convert received data between IP and a non-IP based communications protocols. The transmitting interworking unit receives IP data for the client from the server. The data is converted and transmitted via the non-IP based communications link to the receiving interworking unit, which converts the data back into an IP format and forwards the converted data on to the client. One segment of the path between server and client transports the data in a non-IP format. Neither IP client nor the server are aware of the non IP segment and no change in their IP network mode of operation is required.

19 Claims, 2 Drawing Sheets (51) Int. Cl.
*H04N 21/643* (2011.01)
*H04N 21/647* (2011.01)
*H04N 21/6587* (2011.01)
*H04L 29/06* (2006.01)

(56) References Cited

U.S. PATENT DOCUMENTS

| | | | |
|---|---|---|---|
| 2004/0165586 A1* | 8/2004 | Read et al. | 370/389 |
| 2006/0225118 A1* | 10/2006 | Rolls et al. | 725/118 |
| 2007/0011735 A1* | 1/2007 | Weber et al. | 726/14 |
| 2008/0120667 A1* | 5/2008 | Zaltsman | 725/110 |
| 2008/0209489 A1* | 8/2008 | Joyce et al. | 725/111 |
| 2008/0310435 A1* | 12/2008 | Cagenius et al. | 370/401 |
| 2009/0100489 A1* | 4/2009 | Strothmann | 725/114 |
| 2009/0164642 A1* | 6/2009 | Foti | 709/227 |

FOREIGN PATENT DOCUMENTS

| | | |
|---|---|---|
| JP | 11_088439 A1 | 3/1999 |
| JP | 11-225169 A | 8/1999 |
| JP | 11-225169 A1 | 8/1999 |
| JP | 2006-521041 A | 9/2006 |
| JP | 2006-521041 A1 | 9/2006 |
| WO | 2004/077768 A1 | 9/2004 |
| WO | 2004077768 A1 | 9/2004 |

OTHER PUBLICATIONS

English_Translation_of_Chinese_Office_Action and Chinese Search Report for Chinese Serial No. 200980127918.X, dated Mar. 5, 2013 consisting of 8-pages.

English_Translation_of_Japanese_Office_Action and Japanese Search Report for Japanese Serial No. 2011-508780, dated Apr. 30, 2013 and Japanese Language Japanese Office Action consisting of 9-pages.

2nd Chinese Office Action in both Chinese and its English translation dated Nov. 22, 2013 for corresponding Chinese National Stage Application Serial No. 200980127918.X, Chinese National Stage Entry Date: Jan. 12, 2011, consisting of 7 pages.

3rd Chinese Office Action in both Chinese and its English translation dated Jul. 2, 2014 for corresponding Chinese National Stage Application Serial No. 200980127918.X, Chinese National Stage Entry Date: Jan. 12, 2011, consisting of 7 pages.

1st Korean Office Action in both Korean and its English translation dated Sep. 18, 2014 for corresponding Korean National Stage Application Serial No. 10-2010-7027813, Korean National Stage Entry Date: Dec. 10, 2010 consisting of 12 pages.

1st Japanese Office Action in both Japanese and its English translation dated Nov. 25, 2014 for corresponding Japanese National Stage Application Serial No. 2013-244967, Japanese National Stage Entry Date: Nov. 27, 2013, consisting of 3 pages.

* cited by examiner

Fig. 2

MECHANISM TO DIVERT AN IP FLOW OVER A NON-IP TRANSPORT

TECHNICAL FIELD

The present application relates to communications networks. More specifically the present application concerns methods and systems for transmitting data via a hybrid network where different portions of the network transmit data using different data transmissions protocols.

BACKGROUND OF INVENTION

Traditionally the transport of media streams between a server and client has been assumed to be over links with a single homogeneous transport layer e.g. all RTP over IP (Real-time Transport Protocol over IP), all TDM (Time-Division Multiplexing) or all MPEG-TS (MPEG transport stream).

Cable companies now wish to change from MPEG-TS servers and clients to IP servers and clients. The motivation for the transfer from MPEG-TS servers and clients to IP servers arises due to the desire for Video Entertainment delivery to move from a conventional broadcast structure to a personalized unicast structure. At present in a typical Cable TV network, the distribution of digital entertainment is done over a Hybrid fibre-coaxial (HFC) network as MPEG-TS packets in 6 MHz QAM (Quadrature amplitude modulation) channels. The movement from broadcast to "personalized" unicast is coming, but there is insufficient bandwidth in the IP DOCSIS transport to support the number of viewers that is currently supported by broadcast.

The move from broadcast to unicast therefore requires a massive increase in the capacity of the installed Metro Network. While it is relatively easy and inexpensive to convert the core of the network to operate using an IP based protocol, the HFC first mile or access network would have to be completely changed out for another technology if all the video carried over it today was to be delivered as (unicast) IP packet media streams.

Conventionally approaches to this problem involve keeping two networks in place until there has been a complete changeover to IP everywhere. This approach incurs considerable cost in the First Mile, for example by increasing the IP capacity of Data Over Cable Service Interface Specification (DOCSIS) with node splitting and channel bonding a 1a DOCSIS 3.0, or by overbuilding with a FTTH (Fibre to the Home) solution. Such approaches result in extra costs due to server duplication and change out of clients. A convenient mechanism for managing the transition from the existing delivery system to one based around IP servers and IP clients is therefore required.

SUMMARY OF INVENTION

In accordance with one aspect of the present invention there is provided method of establishing a communications link between a client and a remote server via a receiving interworking unit and a transmitting interworking unit operably connected via a non-internet protocol based communications link, the method comprising: sending a request from a client for the establishment of a communications link between the client and a remote server to the receiving interworking unit; configuring the receiving interworking unit to forward subsequent communications received from the client to the transmitting interworking unit and sending a request from the receiving interworking unit to the transmitting interworking unit to establish a communications link with the remote server; configuring the transmitting interworking unit to forward subsequent communications received from the server to the receiving interworking unit via the non-internet protocol based communications link and sending a request to the remote server for the establishment of a communications link with the remote server; responding to receipt of confirmation from the remote server of the establishment of a communications link between the transmitting interworking unit and the remote server by sending a confirmation of the establishment of the communications link to the receiving interworking unit together with resource descriptor data for subsequent communication between the receiving interworking unit and the transmitting interworking unit via the non-internet protocol based communications link; configuring the receiving interworking unit to convert communications received from the transmitting interworking unit via the non-internet protocol based communications link in a format identified by the received resource descriptor data into an internet protocol based format and send the converted communications to the client; and sending to the client data confirming the establishment of a communications link for subsequent communications for said remote server by sending data confirming the establishment a communications link to said receiving interworking unit.

In accordance with another aspect there is provided a receiving interworking unit operable to: receive an internet protocol based request from a client for the establishment of a communications link between the client and a remote server; configure the receiving interworking unit to forward subsequent communications received from the client to a transmitting interworking unit operably connected to the receiving interworking unit via a non-internet protocol based communications link; send a request to the transmitting interworking unit to establish a communications link with the remote server; and respond to receipt of confirmation from the transmitting interworking unit of the establishment of a communications link with the remote server including resource descriptor data for subsequent communication between the receiving interworking unit and the transmitting interworking unit by: configuring the receiving interworking unit to convert communications received from the transmitting interworking unit via the non-internet protocol based communications link in a manner identified by the received resource descriptor data into an internet protocol based format and send the converted communications to the client; and responding to the request received by the client by sending data to the client confirming the establishment a communications link for sending subsequent communications for said remote server to said receiving interworking unit.

In accordance with a further aspect of the present invention there is also provided a transmitting interworking unit operable to: receive a request for the establishment of a communications link to a remote server from a receiving interworking unit operable connected to the transmitting interworking unit via a non-internet protocol based communications link; configure the transmitting interworking unit to forward subsequent communications received from the server to the receiving interworking unit via the non-internet protocol based communications link; send a request to the remote server for the establishment of a communications link with the remote server; and respond to receipt of confirmation from the remote server of the establishment of a communications link between the transmitting interworking unit and the remote server by sending a confirmation of the establishment of the communications link to the receiving interworking unit together with resource descriptor data identifying the manner the transmitting interworking unit is configured to transmit subsequent communication between the receiving interworking unit and the transmitting interworking unit via the non-internet protocol based communications link.

Embodiments of the present invention further provide a communications network including the above described receiving interworking unit and transmitting interworking unit and computer readable media storing computer implementable instructions which when interpreted by a programmable computer cause the computer to become configured as a receiving interworking unit or a transmitting interworking unit as described above Embodiments of the present invention enable an IP media client, such as an IPTV Set top box, which is operable to receive a regular IP packet media stream from an IP media server, such as an IPTV VOD (Internet protocol—TV Video on demand) video server, where: one segment of the path between server and client transports the media stream in a non-IP format e.g. as MPEG-TS packets over QAM; and neither IP media client nor IP media server is aware of the non IP segment, nor is any change in their all IP network mode of operation required.

In this way unicast content can be originated from IP servers and wrapped in IP headers for efficient transport over the core and distribution parts of a network whilst also using the QAM channels for unicast content. As the signaling to retrieve and control a media stream is exchanged over IP packets any Media Server can operate as if its clients are pure IP clients. More specifically the claimed approach does not require a media server or the core network transport to have any knowledge of how the First Mile network (HFC) describes or allocates QAM channels. Thus, the claimed system facilitates media clients that are actually pure IP clients and those that use existing digital cable STB signaling to be served from the same network and servers.

By allowing the use of IPTV media clients (set top boxes in particular), Ethernet/WLAN distribution in the residence and the use of IP servers and IP over Ethernet in the core network, yet using the existing access technology of MPEG-TS over QAM channels, this invention preserves the current HFC investment and substantially reduces the cost of migrating to IP. Embodiments of the present invention allow for MPEG-TS over QAM Set Top Boxes to work with IP media servers, so that a Cable operator may not have to synchronize the change over to IP of Media Servers with the change over of media clients.

Further as transporting MPEG in a multiplex in a QAM channels is more efficient that transporting the equivalent data using IP DOCSIS, embodiments of the present invention provide means for more efficient transport of such data.

The described systems thereby provide flexible solutions for cable operators as they move from delivering all Entertainment Video as QAM broadcast, to delivering it as personalized unicast streams.

BRIEF DESCRIPTION OF THE DRAWINGS

Further features and advantages of the present invention will become apparent from the following detailed description, taken in combination with the appended drawings, in which.

DETAILED DESCRIPTION OF THE PREFERRED EMBODIMENT

Figure 1:
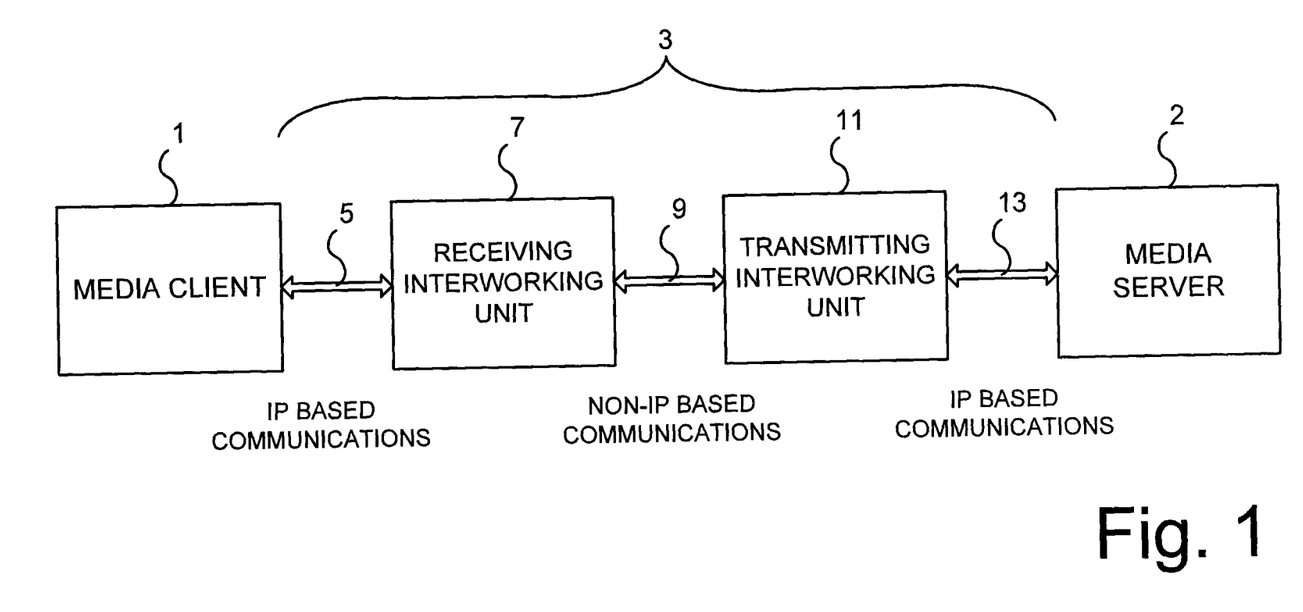
FIG. 1 is a schematic block diagram illustrating a communication system in accordance with an embodiment of the present invention.

FIG. 1 is a schematic block diagram of a communications network in accordance with an embodiment of the present invention. Referring to FIG. 1, a media client 1 is connected to a media server 2 via a communications network 3. The media server 2 could be a media gateway (MG), and a media gateway control function (MGCF) and the network addresses of the signaling endpoints (the Control Point) and the MGCF need not be the same as the network addresses of the source and destination of the media stream.

Typically, the media client 1 will comprise a set-top box (STB) connected to a rendering device. When MPEG media streams are transported to the media client 1, the MPEG media streams are decrypted and decoded and then rendered over an interface such as a High-Definition Multimedia Interface (HDMI) to be displayed on a digital TV. In addition to providing this decryption and decoding function, the media client 1 also is a control point that signals to the media server 2 via the communications network 3 to specify what media streams the media client 1 requires the media server 2 to deliver.

The communications network 3 comprises: an in-residence communications link 5 connecting the media client 1 to a receiving interworking unit (RIU) 7, an access network 9 connecting the RIU 7 to a transmitting interworking unit (TIU) 11 and a core communications network 13 connecting the TIU 11 with the media server 2. The RIU 7 comprises a unit configured to encapsulate specific received MPLS (Multi-Protocol Label Switching) transport streams in accordance with the standards defined in RFC 2250 of the Standards Track for the Network Working group on RTP Payload Format for MPEG1/MPEG2 Video. The TIU 11 comprises a unit configured to extract MPEG TS from packets formatted according to RFC 2250. Both the RIU 7 and TIU 11 comprise units configured to observe and interpret protocol exchange in accordance with the standards defined in RFC 2326 of the Standards Track for the Network Working group on the Real Time Streaming Protocol (RTSP).

The in-residence communications link 5 and the core communications network 13 comprise data communications networks operable to transmit media stream packets using an IP transmission protocol such as RTP over IP. In contrast, the access network 9 comprises a communications network operable to transmit data using a non-IP based communications protocol. In this embodiment, this non-IP based communications protocol is arranged to provide bi-directional transport for IP packets as well as transmission of media stream packets from the TIU 11 to the RIU 7 as MPEG-TS packets over QAM.

In overview, when a media stream or other communications are to be transmitted between the media server 2 and the media client 1, initially a communications link is established between the media client 1 and the media server 2. As will be described in detail later, this communications link is established so as to pin the session flows to a certain route which includes the transmission of data between the RIU 7 and the TIU 11. Additionally the flowspec identifying the routing for communications between the media server 1 and the media client 2 is also modified so that the RIU 7 and the TIU 11 interpret fields in the flowspec as a descriptor for a transport resource between the gateways they control. The RIU 7 and the TIU 11, then instead of merely performing IP address header manipulation transform the media stream between the IP packet carriage and another form of transport (in this embodiment into MPEG-TS packets over QAM).

Thus in this way the communications network 3 is modified so as enable the media stream to be transmitted between the TIU 9 and the RIU 7 via the access network 9 in the non-IP based format that the access network 9 is able to support. This modification results from changes to the operation of the RIU 7 and the TIU 11 and is therefore achieved without the media client 1 or the media server 2 having to be aware of the non-IP transmission segment or having to modify their modes of IP network operation.

Figure 2:
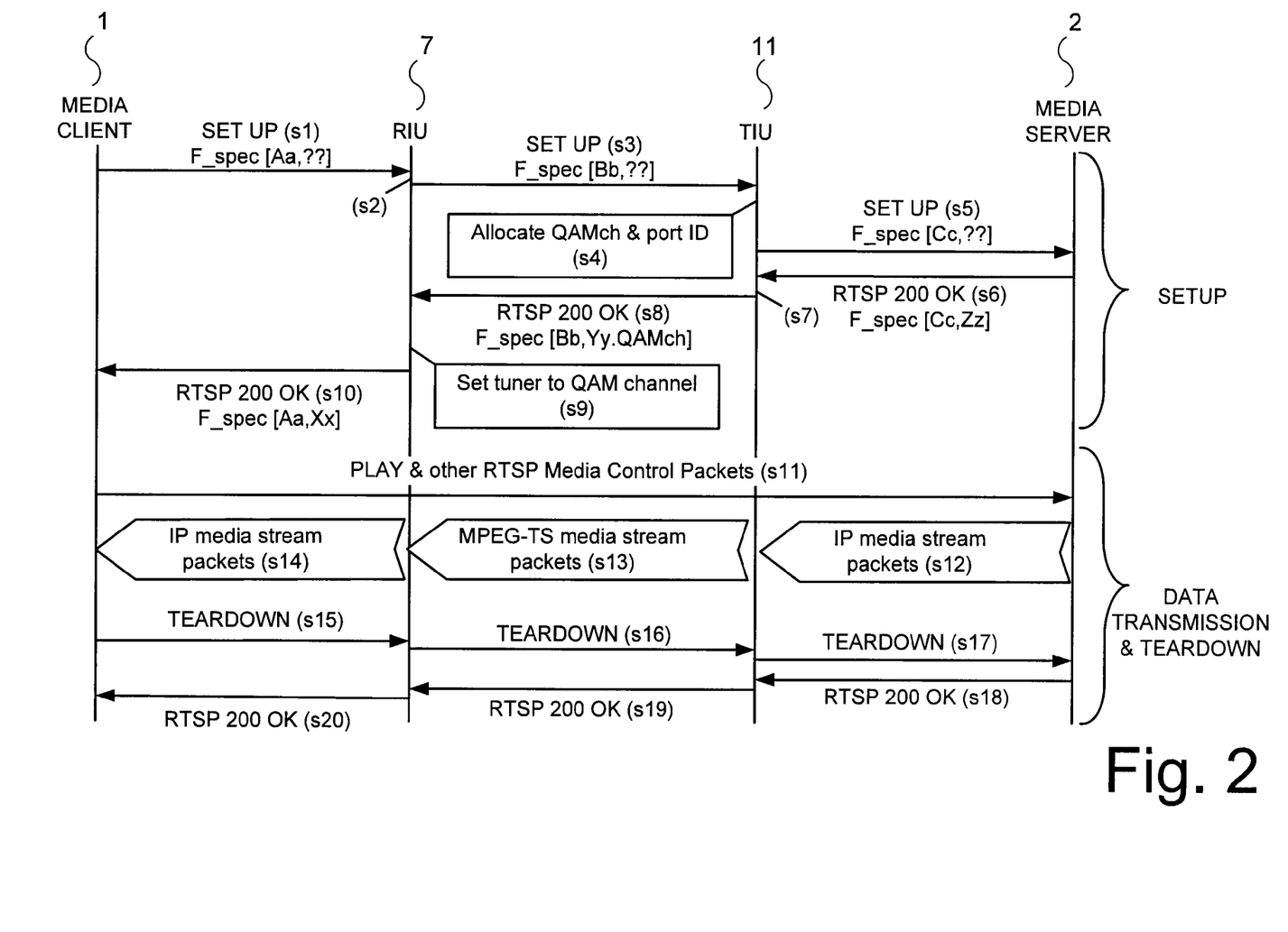
FIG. 2 is a message flow diagram schematically illustrating the operation of the communications system of FIG. 1.

The operation of the communications network will now be described in greater detail with reference to FIG. 2 which is a message flow diagram schematically illustrating the operation of the communications system of FIG. 1.

Setup

As a first step the media client 1, generates (s1) a SETUP message. In the message the media client end of the bearer flow will be specified as originating at an IP address identifying the media client and a port number. However at the start of the session the end of the bearer flow is unknown to the media client 1. The flowspec included in the SETUP message can therefore be considered to be of the form [Aa,??] where Aa identifies the IP address A and port a the media client 1 wishes to use for receiving the RTP MPEG stream. The message is then transmitted from the media client 1 to the RIU 7 via the in-residence communications link 5.

When the SETUP message issued by the media client 1 reaches the RIU 7, the RIU 7 chooses a TIU 11 to pin the bearer path through, and requests, or generates, a mapping (s2) to apply to the media client and a port number Aa received as part of the SETUP message. Assuming the result is the mapping Aa=>Bb, the RIU 7 modifies the flowspec, replacing the media client's originating IP Address and port Aa with the RIU's IP and port Bb. The RIU 7 then transmits (s3) a SETUP message including the modified flowspec into the TIU 11.

When this SETUP message reaches the TIU 11, the TIU 11 allocates (s4) a QAM channel and multiplex id for communications between the TIU 11 and the RIU 7 via the access network 9. The TIU 11 also requests or generates a further mapping to apply to the received IP address port pairing Bb. Again assuming the result is Bb:=>Cc, the flowspec is then modified to [Cc,??]. A modified SETUP message incorporating the flowspec [Cc, ??] is then forwarded (s5) on to the media server 2 via the core communications network 13.

From the perspective of the media server 2, the SETUP message it receives is requesting a bearer flow with an end point of Cc.

Assuming the media server 2 replies (s6) with a 200 OK message, it will specify its end of the bearer stream (as Zz, for example), so that the flowspec in the Simple Direct Media Layer (SDL) of the 200 OK message 34 will be [Cc, Zz].

(Those skilled in the art will recognize that the response message that carries the destination flowspec part may be the 180 Ringing message.) The 200 OK message traverses the reverse path of the SETUP message, and arrives back at the TIU 11. The TIU 11 will (s7) request or generate another mapping (e.g. Yy<=Zz) and then activate the full IP header bi-directional Network Address translation of Bb<=>Cc, Yy<=>Zz. Finally the TIU 7 modifies the flowspec in the 200 OK message to show the bearer flow source address and port as Yy. QAMch, and the destination as Bb where QAMch is data identifying the QAM channel and multiplex id allocated by the TIU 11 for communications between the RN 7 and the TIU 11. A modified RTSP 200 OK message incorporating the flow spec [Bb, Yy.QAMch] is then forwarded (s8) from the TIU 11 to the RIU 7.

At the RIU 7, the receipt of the 200 OK message causes (s9) the RIU 7 to set a tuner to the QAM channel allocated by the TIU 11 for communications between the RIU 7 and the TIU 11 as identified by QAMch data included in the message. The RIU then requests or generates, the mapping Xx<=Yy, and the activates the bi-directional mapping Aa<=>Bb, Xx<=>Yy. The RIU 7 then forwards (s10) a 200 OK message with an flowspec of [Aa, Xx] on back to the media client.

The above set up process effectively segments the bearer flow into three bearer flow segments and installs mappings in the RIU 7 and TIU 11 to "re-label" packets so that they are forwarded onto the next segment.

Thus when the media client 1 wishes to send bearer packets to the media server 2, the media client 1 puts a destination address of Xx on them, the destination address it received in the 200 OK flowspec with Xx being an address and port number provided by the RIU 7. A second segment is then the exchange segment between the RIU 7 and the TIU 11 and the third segment, is between the TIU 11 (advertiser of the address C on the core network) and the media sever 2 (address Z).

Notably, this segmentation forces the transmission of data so as to flow between the media client 1 and media server 2 via the RIU 7 and TIU 11 without the media client 1 or the media server 2 having to specify that such a routing is to be fixed and in a manner which is transparent to both the media client 1 and media server 2. As far as the media client 1 is concerned a SETUP request issued to the media server 2 has provided a destination IP and port address Xx. Similarly as far as the media server 2 is concerned, the media server 2 has identified a destination IP and port address Zz in response to a request originating from an origin IP and port address Cc.

Additionally, the above described set up process also enable the RIU 7 and the TIU 11 to exchange data identifying the resource descriptor (QAM Channel, multiplex id) that a media stream is to use for subsequent communication. This is achieved by encoding this data as part of the modified flowspec passed from the TIU 11 to the RIU 7. By transmitting this data in this way no extra signaling is needed to set up the QAM transport.

Data Transmission and Teardown

Following the initial set up stage, no media stream packets are sent from the media server 2 to the media client 1 until a PLAY instruction is generated by the media client 1 and transmitted (s11) via the communications network to the media server 2.

In response to receipt of a PLAY instruction, the media server 2 generates and transmits (s12) a media stream in the form of IP media stream packets from the media server 2 to the TIU 11. These IP media packets are transmitted to the IP address and IP port Cc previously identified to the media server 2 in the SETUP message (s5) sent to the media server 2 by the TIU 11.

When these IP media packets are received by the TIU 11, the IP address and IP Cc are used to identify the receive packets as being required to be forwarded to the RIU 7 associated with IP address Bb by the mapping obtained by the TIU 11 at step s4. The TIU 11 then converts the IP media packets into data for transmission via the access network 9 as MPEG-TS media stream packets. Depending upon how the media stream is transported as an IP media stream over the core network 13 between the media server 2 and the TIU 11 this conversion may be a trivial task (e.g. when MPEG-TS packets are carried over RTP and they are to be carried as straight MPEG-TS packets) or may involve complete serialization of the stream and re-packetization.

With the media stream having been reformatted by the TIU 11, the TIU 11 then proceeds to transmit (s13) the reformatted media stream to the RIU 7 via the access network 9 using the QAM channel previously allocated for the transmission (at step s4) and the IP and port addresses Bb previously received from the RIU 7 (at step s3) as identified by the stored mapping data.

The tuner provided at the RIU 7 tuned (at step s9) to listen for an MPEG-TS media stream at the allocated QAM channel then converts a MPEG-TS media stream received by the RIU 7 via the access network 9 back into IP media stream packets by performing the inverse operation to the conversion operation previously performed by the TIU 11.

Finally, the RIU 7 then transmits (s14) the converted media stream to the media client 1 as IP media stream packets via the in-residence communications link 5 using the IP and port address Bb associated with the mapping Aa<=>Bb to identify Aa as the destination address.

Steps s11-s14 are repeated in response to further PLAY instructions or other RTSP media control instructions received by the media server 2. Finally when it is indicated to the media client 1 that the session is to be ended, the media client 1 sends (s15) a TEARDOWN request to the RIU 7. This is received by the RIU 7, which re-addresses the request and relays (s16) it to the TIU 11, which then causes (s17) the TIU 11 to send a TEARDOWN request to the media server 2. Each of these messages result in a corresponding acknowledgement (s18-s20), corresponding removal of state for the RTSP session and the communication session is ended.

Other Embodiments and Modifications

In the above described embodiment, a specific example of the manner in which a routing between a media client 1 and a media server 2 may be fixed so as to pass via an identified RIU 7 and TIU 11 is described. It will be appreciated that the present invention is not limited just to the disclosed approach and that any suitable means may be used. Examples of other suitable approaches for pinning the route of IP bearer flows may are disclosed in the applicant's co-pending U.S. Ser. No. 11/610,794 published as US 2008-0144615 and PCT application PCT/CA2007/002045 published as WO 2008/070957 both of which are incorporated by reference.

It will also be appreciated that various different methods could be utilized to provide the interworking units of bookending the HFC segment with data identifying the manner in which data is to be converted and transmitted via a non-IP based transmission path. This would include converting data in other ways other than the conversion for data for transmission via other channels other than transmission via a QAM channel.

Although in the above described embodiment, data for selecting a non-IP based transmission format is described as being transmitted by modifying an inband flowspec controlled by a NAT mapping to describe a transport resource for a different type of network altogether, other ways of providing this data to nodes connected via an HFC data path are possible. Further various different formats for encoding data which a next signaling Hop interprets as a descriptor for a transport resource between the gateways they control will be apparent to those skilled in the art.

It will also be understood that the present invention is also applicable to the case where there is no session signaling involved. In particular the present invention may be extended to the transmission of switched digital broadcast. In such a system an alternative method of providing resource descriptor data in, for example, a channel change message in some fashion e.g. QAM channel and PID in the IP multicast address in IGMP join messages would be required.

Although the embodiments of the invention described with reference to the drawings comprise computer apparatus and processes performed in computer apparatus, the invention also extends to computer programs, particularly computer programs on or in a carrier, adapted for putting the invention into practice. The program may be in the form of source or object code or in any other form suitable for use in the implementation of the processes according to the invention. The carrier can be any entity or device capable of carrying the program.

For example, the carrier may comprise a storage medium, such as a ROM, for example a CD ROM or a semiconductor ROM, or a magnetic recording medium, for example a floppy disc or hard disk. Further, the carrier may be a transmissible carrier such as an electrical or optical signal which may be conveyed via electrical or optical cable or by radio or other means.

When a program is embodied in a signal which may be conveyed directly by a cable or other device or means, the carrier may be constituted by such cable or other device or means.

Alternatively, the carrier may be an integrated circuit in which the program is embedded, the integrated circuit being adapted for performing, or for use in the performance of, the relevant processes.

The invention claimed is:

1. A receiving interworking unit ("RIU") configured to:
receive an internet protocol based request from a client for the establishment of a client-server communications link between the client and a remote server;
forward subsequent communications received from the client to a transmitting interworking unit ("TIU") via a non-internet protocol based communications link;
send a request to the TIU to establish a communications link between the remote server and the TIU;
receive from the TIU a confirmation indicating the establishment of the communications link with the remote server, the confirmation including resource descriptor data to be used in subsequent communication between the RIU and the TIU, the resource descriptor data including a TIU internet protocol ("IP") address and TIU port ID, an RIU IP address and RIU port ID;
convert communications received from the TIU via the non-internet protocol based communications link in a manner identified by the received resource descriptor data into an internet protocol based format;
send the converted communications to the client; and
respond to the internet protocol based request received from the client by sending a response to the client, the response including data confirming the establishment of a client-unit communications link between the client and the RIU for sending subsequent communications to said remote server via the RIU.

2. The RIU of claim 1, wherein the internet protocol based request from the client includes a client internet address and a client port identification ("ID") associated with the client, wherein the request sent to the TIU is sent via the non-internet protocol based communications link, the request including the RIU IP address and the RIU port ID associated with the RIU, and wherein the RIU is further configured to:
generate and store a first mapping between the client IP address and the client port ID and the RIU IP address and the RIU port ID.

3. The RIU of claim 2,
wherein the RIU is further configured to:
generate and store a second mapping between both the RIU IP address and the RIU port ID, and an obtained second data identifying the RIU IP address and the RIU port ID, and wherein
the response to the client further includes the second mapping.

4. The RIU of claim 1, wherein the RIU is further configured to:
communicate with the TIU via the non-internet protocol based communications link, using Quadrature Amplitude Modulation; and wherein the resource descriptor data included in the confirmation received from the TIU indicating the establishment of the communications link further includes a Quadrature Amplitude Modulation Channel for use in subsequent communication between the RIU and the TIU; and
in response to receiving the confirmation, setting a tuner to the Quadrature Amplitude Modulation Channel allocated by the TIU for subsequent communications between the RIU and the TIU.

5. The RIU of claim 4, wherein converting communications received from the TIU via the non-internet protocol based communications link includes converting MPEG-TS packets received via the identified Quadrature Amplitude Modulation Channel into IP media stream packets for transmission to the client.

6. A transmitting interworking unit ("TIU") configured to:
receive an establishment request for the establishment of a communications link between the TIU and a remote server from a receiving interworking unit ("RIU") via a non-internet protocol based communications link;
forward subsequent communications received from the remote server to the RIU via the non-internet protocol based communications link;
send a request to the remote server for the establishment of the communications link;
receive a confirmation from the remote server of the establishment of the communications link;
send to the RIU, in response to the received confirmation, resource descriptor data identifying a manner the TIU is configured to transmit subsequent communication to the RIU via the non-internet protocol based communications link, the resource descriptor data including a TIU internet protocol ("IP") address and TIU port ID, an RIU IP address and RIU port ID;
convert communications received from the RIU via the non-internet protocol based communications link in a manner identified by the received resource descriptor data into an internet protocol based format; and
send the converted communications to the remote server.

7. The TIU of claim 6, wherein the
confirmation from the remote server includes first data identifying both a remote server IP address and a remote server port ID and the TIU IP address and the TIU port ID, the TIU further configured to:
generate and store a second mapping between the received first data identifying both the remote server IP address and the remote server port ID, and an obtained second data identifying both the TIU IP address and the TIU port ID; and
send to the receiving interworking unit the obtained second data identifying both the TIU IP address and the TIU port ID mapped to the first data identifying both the remote server IP address and the remote server port ID.

8. The TIU of claim 7, wherein the TIU is further configured to append resource descriptor data to the second data identifying the TIU IP address and the TIU port ID, the resource descriptor data including a Quadrature Amplitude Modulation channel.

9. The TIU of claim 7, wherein the TIU is further configured to:
communicate with the RIU via the non-internet protocol based communications link using Quadrature Amplitude Modulation; and
append resource descriptor data identifying a Quadrature Amplitude Modulation channel and a multiplex ID to the second data identifying the TIU IP address and the TIU port ID, the resource descriptor data to be used in subsequent communications between the TIU and the RIU.

10. The TIU of claim 6, wherein the TIU is further configured to:
allocate a Quadrature Amplitude Modulation Channel and a multiplex ID for use in subsequent communication between the RIU and the TIU; and
wherein the resource descriptor data sent to the RIU includes the Quadrature Amplitude Modulation Channel allocated for subsequent communication between the RIU and the TIU.

11. The TIU of claim 10, wherein the TIU is responsive to receipt of communications from the remote server via the communications link established in response to the establishment request received from the RIU to convert communications received from the remote server into MPEG-TS packets and transmit the MPEG-TS packets via the non-internet protocol based communications link using the allocated Quadrature Amplitude Modulation Channel.

12. A communications network comprising:
a receiving interworking unit ("RIU") and a transmitting interworking unit ("TIU"), the RIU configured to:
receive an internet protocol based request from a client for the establishment of a client-server communications link between the client and a remote server;
forward subsequent communications received from the client to the TIU via a non-internet protocol based communications link;
send a request to the TIU to establish a communications link between the remote server and the TIU;
receive from the TIU a confirmation indicating the establishment of the communications link with the remote server, the confirmation including resource descriptor data to be used in subsequent communication between the RIU and the TIU, the resource descriptor data including a TIU internet protocol ("IP") address and TIU port ID, an RIU IP address and RIU port ID;
convert communications received from the TIU via the non-internet protocol based communications link in a manner identified by the received resource descriptor data into an internet protocol based format;
send the converted communications to the client; and
respond to the internet protocol based request received from the client by sending a response to the client, the response including data confirming the establishment of a client-unit communications link between the client and the RIU for sending subsequent communications to said remote server via the RIU;
the TIU configured to:
receive an establishment request for the establishment of a communications link between the TIU and a remote server from the RIU via a non-internet protocol based communications link, the non-internet protocol based communications link configured to transmit communications between the RIU and the TIU;

forward subsequent communications received from the remote server to the RIU via the non-internet protocol based communications link;

send a request to the remote server for the establishment of the communications link;

receive a confirmation from the remote server of the establishment of the communications link; and send to the RIU, in response to the received confirmation, resource descriptor data identifying a manner the TIU is configured to transmit subsequent communication to the RIU via the non-internet protocol based communications link, the resource descriptor data including the TIU IP address and TIU port ID, the RIU IP address and RIU port ID.

13. A method of establishing a communications link between a client and a remote server via a receiving interworking unit ("RIU") configured to communicate with a transmitting interworking unit ("TIU") via a non-internet protocol based communications link, the method comprising:

receiving, at the RIU, an internet protocol based request from the client for the establishment of a client-server communications link between the client and the remote server;

configuring the RIU to forward subsequent communications received from the client to the TIU via the non-internet protocol based communications link;

sending a request from the RIU to the TIU to establish a communications link with the remote server;

configuring the TIU to forward subsequent communications received from the remote server to the RIU via the non-internet protocol based communications link and to send a request to the remote server for the establishment of the communications link with the remote server;

receiving at the RIU a confirmation of the establishment of the communications link together with resource descriptor data for subsequent communication between the RIU and the TIU via the non-internet protocol based communications link, the resource descriptor data including a TIU protocol ("IP") address and TIU port ID, an RIU IP address and RIU port ID;

configuring the RIU to convert communications received from the TIU via the non-internet protocol based communications link in a format identified by the received resource descriptor data into an internet protocol based format and to send the converted communications to the client; and sending to the client data confirming the establishment of a communications link for subsequent communications for said remote server by sending data confirming the establishment of a communications link to said receiving interworking unit.

14. The method of claim 13 wherein the request from the client for the establishment of the client-server communications link identifies an IP address and a port ID for the client, the method further comprising:

generating and storing a first mapping at the RIU between the identified IP address and port ID for the client and the IP address and port ID for the RIU; and including the IP address and port ID for the RIU in the request sent to the TIU.

15. The method of claim 14 further comprising:

generating and storing at the TIU a second mapping between the IP address and port ID for the RIU included in the request sent to the TIU and the IP address and port ID for the TIU; and including the obtained IP address and port ID for the TIU in the request sent to the remote server.

16. The method of claim 15 wherein the confirmation from the remote server of the establishment of a communications link between the TIU and the remote server identifies an IP address and a port ID for the remote server, the method further comprising:

generating and storing at the TIU a third mapping between the identified IP address and port ID for the server and the IP address and port ID for the TIU; and including the IP address and port ID for the TIU in the resource descriptor data for subsequent communication between the receiving interworking unit and the TIU via the non-internet protocol based communications link.

17. The method of claim 16 further comprising:

generating and storing at the RIU a fourth mapping between an IP address and port ID for the TIU and an IP address and a port ID for the RIU; and including the IP address and port ID for the RIU in the confirmation sent to the client when confirming the establishment of the communications link for sending subsequent communications for said remote server.

18. The method of claim 13 wherein the RIU is configured to communicate with the TIU via the non-internet protocol based communications link using Quadrature Amplitude Modulation, and wherein configuring the TIU to forward subsequent communications received from the remote server to the RIU via the non-internet protocol based communications link comprises:

allocating a Quadrature Amplitude Modulation Channel and multiplex ID for subsequent communications between the TIU and RIU;

including data identifying the allocated Quadrature Amplitude Modulation Channel and the multiplex ID in the resource descriptor data sent from the TIU to the RIU; and responding to receipt of resource descriptor data by the RIU identifying the allocated Quadrature Amplitude Modulation Channel and multiplex ID by setting a tuner at the RIU to the allocated Quadrature Amplitude Modulation Channel to receive subsequent communications from the TIU.

19. A method of transmitting data from a remote server to a client, the method comprising:

establishing a client-server communications link between the client and the remote server via a receiving interworking unit ("RIU") and a transmitting interworking unit ("TIU"), the RIU and the TIU configured to communicate via a non-internet protocol based communications link using Quadrature Amplitude Modulation;

allocating via the transmitting interworking unit a Quadrature Amplitude Modulation Channel and multiplex identifier ("ID") for subsequent communications between the RIU and the TIU;

sending from the TIU to the RIU a resource descriptor data including data identifying the Quadrature Amplitude Modulation Channel, the multiplex ID, a TIU Internet protocol ("IP") address and TIU port ID, and an RIU IP address and RIU port ID;

setting a tuner, by the RIU, to the allocated Quadrature Amplitude Modulation Channel to receive subsequent communications from the TIU;

sending IP media stream packets from the server to the TIU;
converting IP media stream packets received by the TIU into MPEG-TS packets;
transmitting the converted packets via the non-internet protocol based communications link from the TIU to the RIU using the allocated Quadrature Amplitude Modulation Channel and multiplex ID;
converting the MPEG-TS packets received by the RIU into IP media stream packets; and
transmitting the IP media stream packets from the RIU to the client.

\* \* \* \* \*